(12) United States Patent
Muppirala et al.

(10) Patent No.: US 7,610,429 B2
(45) Date of Patent: Oct. 27, 2009

(54) METHOD AND SYSTEM FOR DETERMINING DEVICE CRITICALITY IN A COMPUTER CONFIGURATION

(75) Inventors: Kishore Kumar Muppirala, Karnataka (IN); Santosh Rao, Santa Clara, CA (US); Harish S. Babu, Santa Clara, CA (US); Ashok Rajagopalan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 11/668,493

(22) Filed: Jan. 30, 2007

(65) Prior Publication Data
US 2008/0183659 A1 Jul. 31, 2008

(51) Int. Cl.
*H05K 7/10* (2006.01)
(52) U.S. Cl. .................................. 710/302; 370/256
(58) Field of Classification Search ......... 710/301–304; 709/220–223; 370/254–258
See application file for complete search history.

(56) References Cited

U.S. PATENT DOCUMENTS

| 5,394,556 | A | * | 2/1995 | Oprescu | 709/220 |
| 5,515,487 | A | * | 5/1996 | Beaudet et al. | 345/440 |
| 5,537,593 | A | * | 7/1996 | Diamond et al. | 719/313 |
| 5,630,173 | A | * | 5/1997 | Oprescu | 710/40 |
| 6,105,018 | A | * | 8/2000 | Demers et al. | 707/2 |
| 6,282,596 | B1 | * | 8/2001 | Bealkowski et al. | 710/302 |
| 6,892,264 | B2 | * | 5/2005 | Lamb | 710/301 |
| 6,920,625 | B2 | * | 7/2005 | Gass | 716/10 |
| 6,938,084 | B2 | * | 8/2005 | Gamache et al. | 709/226 |
| 6,996,658 | B2 | * | 2/2006 | Brocco et al. | 710/312 |
| 7,177,959 | B2 | * | 2/2007 | Fukunaga | 710/18 |
| 7,203,191 | B2 | * | 4/2007 | Garcia-Luna-Aceves et al. | 370/389 |
| 2004/0032831 | A1 | * | 2/2004 | Matthews | 370/238 |
| 2004/0225979 | A1 | * | 11/2004 | Liu et al. | 716/7 |
| 2005/0108379 | A1 | * | 5/2005 | Gray et al. | 709/223 |
| 2005/0169186 | A1 | * | 8/2005 | Qiu et al. | 370/242 |
| 2007/0011499 | A1 | * | 1/2007 | Bergsten et al. | 714/100 |
| 2007/0208693 | A1 | * | 9/2007 | Chang et al. | 707/2 |

* cited by examiner

*Primary Examiner*—Paul R Myers

(57) ABSTRACT

A method for determining the criticality of a device in a multi-path computer configuration comprising the steps of: traversing a directed acyclic graph representing a platform hierarchy; and determining paths within the directed acyclic graph affected by the removal of the device. A computer system comprising a directed acyclic graph data structure representing a platform hierarchy; and a control arrangement for traversing the directed acyclic graph to determining paths therein affected by removal of a device.

12 Claims, 5 Drawing Sheets

METHOD AND SYSTEM FOR DETERMINING DEVICE CRITICALITY IN A COMPUTER CONFIGURATION

BACKGROUND OF THE INVENTION

Modern computing systems can be found in many forms including, for example, mainframes, minicomputers, workstations, servers, personal computers, internet terminals, notebooks and embedded systems. A typical computer system includes a processor, associated memory and control logic (typically on a system board) and a number of peripheral devices that provide input and/or output (I/O) for the system. Computer system boards often receive expansion printed circuit boards to increase the capabilities of the computer system and to connect to peripheral devices through an expansion bus.

In general, computer systems include multiple extension slots on a communication bus to provide access to external peripheral devices using add-in cards. The add-in cards expand the functionality of the computer system and can be, for example, a network interface card, a graphics card, storage controllers or the like. The architecture and functioning of the communication bus and interfaces are often standardized throughout the computer industry to allow multiple equipment vendors to provide external peripheral devices for the computer systems. One such standard is the PCI Hot-Plug Specification, Rev. 1.0 and 1.1 defined by PCI Special Interest Group and incorporated herein by reference in its entirety. The PCI Hot-Plug specification defines some of the key aspects of a process of inserting and removing add-in cards in the extension slots of a PCI bus in a computer system while the computer system is running.

The PCI Hot-Plug specification describes a hardware platform such as a computer system that may accept a hot-plug event such as an insertion or removal of an add-in card without rebooting the computer system. Typically, the hot-plug events are controlled by a hot-plug controller in the computer system. A hot-plug event driver in the computer system processes the hot-plug events for the hot-plug controller. The PCI Special Interest Group has also defined a standard for the hot-plug controllers in the PCI Standard Hot-Plug Controller and Subsystem Specification Rev. 1.0 (hereinafter referred to as the "controller specification") which is also incorporated herein by reference in its entirety. The controller specification defines the general interface of hot-plug events with the hardware platform.

One of the key aspects of on-line hot-plugging of devices into a computer system is to analyze the impact of such an operation on the system. Such an analysis is especially important if hot plugging removes a device or makes a group of devices unavailable to the computer system. This operation is referred to as Critical Resource Analysis (CRA).

BRIEF DESCRIPTION OF THE DRAWINGS

Embodiments of the invention will now be described, by way of example only, with reference to the accompanying drawings in which elements having the same reference numeral designations represent like elements throughout and in which.

DETAILED DESCRIPTION OF EMBODIMENTS OF THE INVENTION

The following description of the preferred embodiment(s) is merely exemplary in nature and is in no way intended to limit the invention, its application, or uses. In addition, a "memory" of a computing apparatus may comprise of any appropriate types of primary or secondary storage, unless the type of memory is further specified. Examples of primary storage include cache memory, random access memory and read only memory. Examples of secondary storage include hard disks, floppy diskettes, CD-ROMs and CD-RW. One skilled in the art would take into account whether a memory must be writable or need only be readable to determine whether a particular type of primary or second storage would be appropriate for a given use.

There will be described a method, a system and a computer program for determining device criticality with respect to a hot-plugging operation in a multi-path computer configuration by representing a platform hierarchy, including potentially multiple paths to affected devices, with a directed acyclic graph (DAG).

A directed acyclic graph, which will in the following sometimes be abbreviated to DAG, is a directed graph with no directed cycles. In a DAG, for any given vertex v, there is no non empty directed path starting and ending on v. Directed acyclic graphs appear in models where it may not make sense for a vertex to have a path to itself for example if an edge u→v indicates that vertex v is a part of vertex u, such path would indicate that vertex u is a part of itself which may be improbable.

Figure 5:
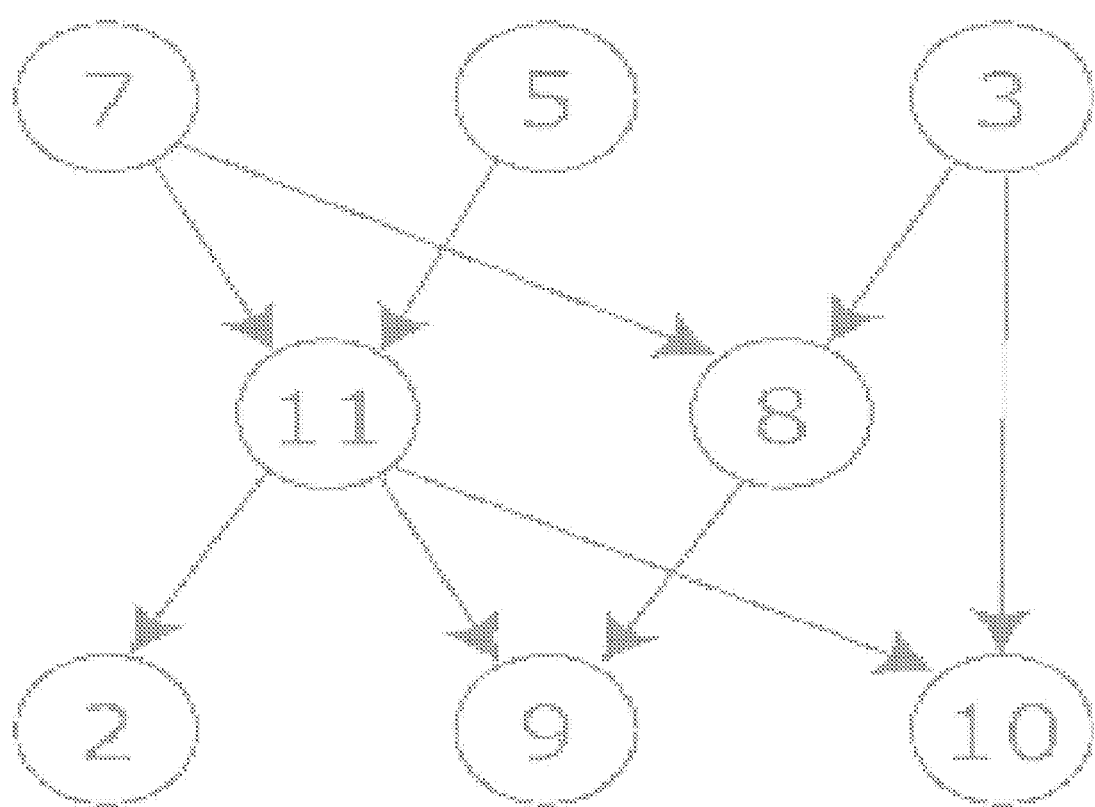
FIG. 5 illustrates the general form of a directed acyclic graph.

The directed acyclic graph may correspond to a partial order on its vertices. For two given vertices u and v of a DAG; $a \leq v$ is in the partial order exactly when there is a directed path from vertex u to vertex v in the graph. However many different directed acyclic graphs may represent the same partial order in this way. Among these graphs, the one with fewest edges is in the transitive reduction and the one with the most edges is in transitive closure. In a DAG a source is a vertex with no incoming edges. Similarly a sink is a vertex with no outgoing edges. A finite DAG has at least one source and at least one sink. The length of a DAG is the length (number of edges) of a longest directed path. A typical structure of a directed acyclic graph is illustrated in FIG. 5.

Figure 1:
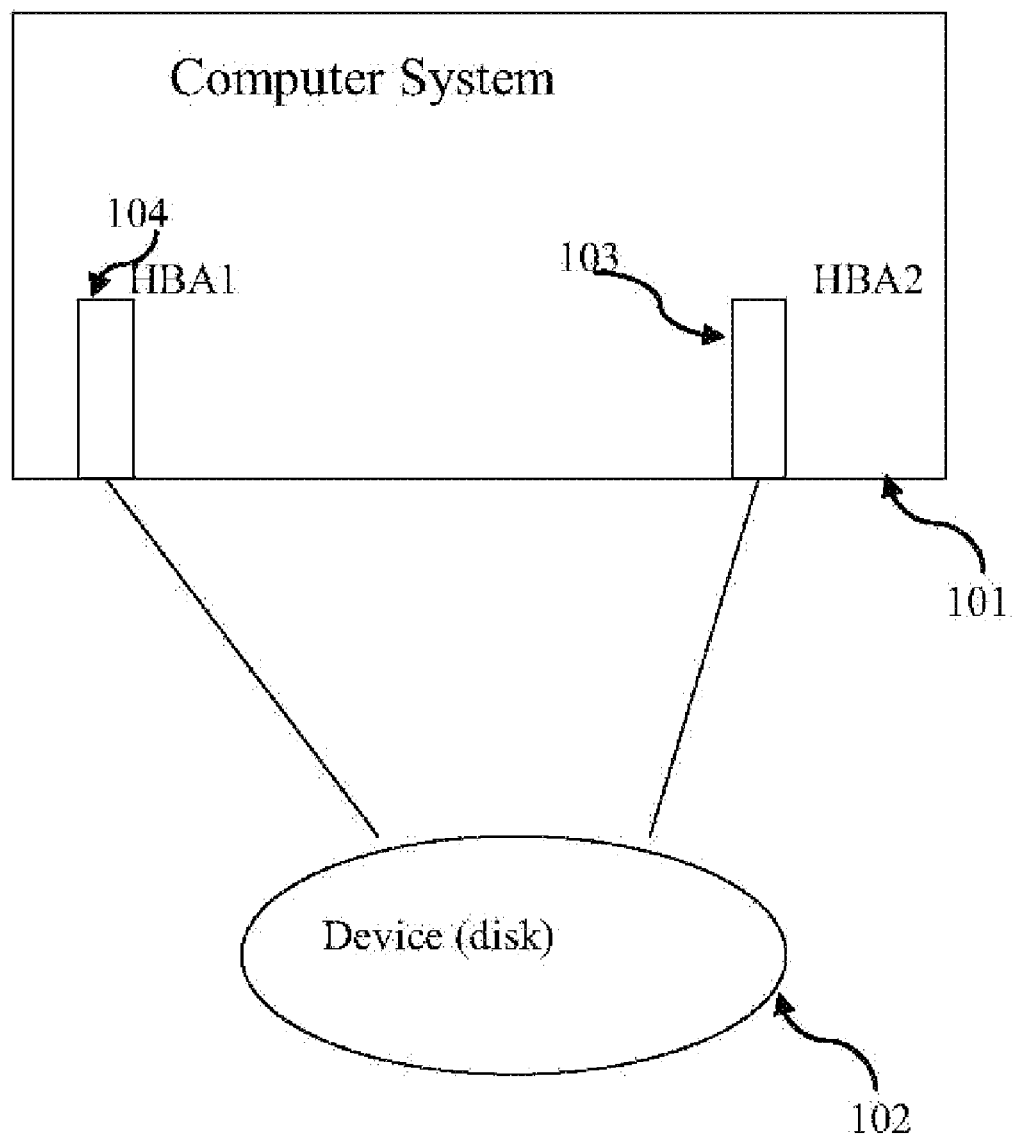
FIG. 1 is a, schematic diagram illustrating a high availability computer configuration.

FIG. 1 illustrates a high availability computer configuration. The highly available configuration may consist of a computer system 101 that may comprise two host bus adapters HBA1 103 and HBA2 104 to connect it to a peripheral device 102, which may be a memory device or a group of memory devices being accessed by the host bus adapters. Such a computer system may consist of any number of host bus adapters depending on the requirements of the computing environment. Similarly, the peripheral device 102 may comprise a single device and/or a group of devices. The peripheral device 102 in a computer may be connected to a motherboard via a Peripheral Component Interconnect (PCI) bus, for instance.

In a multi-path computer configuration such as that illustrated in FIG. 1, a device such as device 102 may be accessed by more than one defined path via host bus adapters, such as HBA1 104 or HBA2 103. These device paths i.e. the paths through which devices are connected to the host bus adapters, may be represented in the form of a directed acyclic graph. A component hierarchy of a more complex such computer system, in form of directed acyclic graph is illustrated in FIG. 2 as an example.

Figure 2:
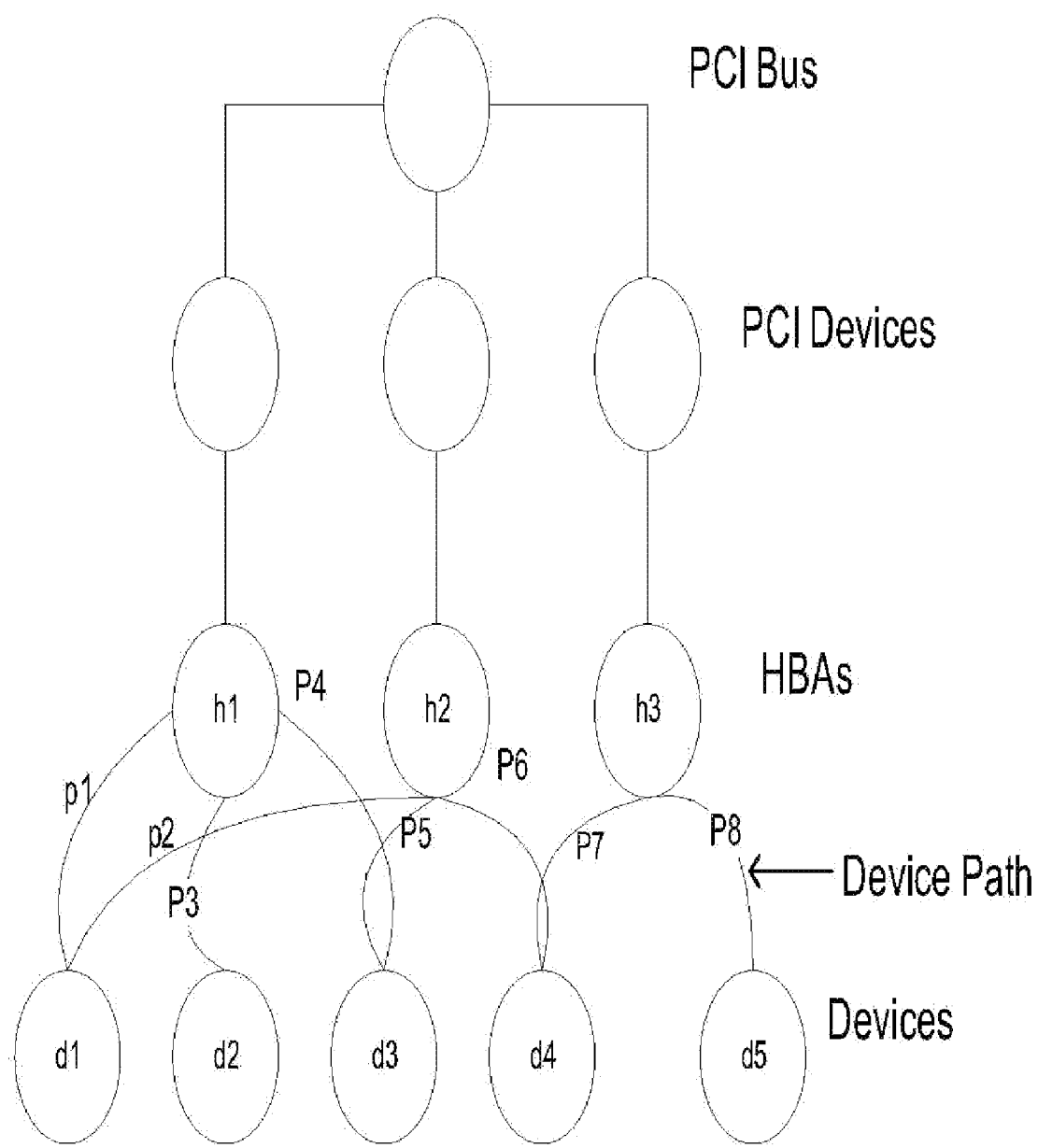
FIG. 2 is a schematic diagram illustrating a component hierarchy in the form of a directed acyclic graph.

Referring to FIG. 2, there are three devices connected to computer system via a PCI bus. They may also be referred as PCI devices and/or peripheral devices.

During the boot process, the system firmware may examine the PCI configuration space of each device and allocate the system resources. According to the PCI specifications, each device may request up to six areas of memory space or I/O port space for its functioning. In a typical system, the operating system queries all PCI buses at startup time to list the devices that are present and system resources (memory, interrupt lines, etc.) required by each such device. The operating system then may allocate the resources and inform the device about the resources allocated to the particular device.

The computer configuration illustrated in FIG. 2 by way of example comprises three host bus adapters (h1, h2 and h3) and five devices (d1, d2, d3, d4 and d5) connected to the host bus adapters. The devices are connected to the host bus adapters via 8 device paths P1, P2, P3, P4, P5, P6, P7 and P8. For example the device d1 is connected to host bus adapters through two paths P1 and P2. Similarly device d2 is connected through paths P4 and P5. The devices may be accessed by the host bus adapters through any of the device paths through which they are connected.

The system hierarchy in the form of a DAG data structure is maintained by the operating system and created at start-up time. The structure may include at each node certain attributes associated with each of the components of the computer system, such as the number of paths to a device, whether or not the device is a boot device or quorum disk, for instance, or other information that may be useful in determining device criticality as described below. The complete component hierarchy of the computer system may be accessible either from user space or kernel space.

The hot plug operation allows a hot plug device to be added to or removed from the computer system. Typically in such systems, to remove a hot ping device from computer system the user presses an attention button located on the hot plug device, which initiates a hot plug operation to remove the hot plug device. Once the hot plug operation has completed, an indication may be displayed (such as by a light or sound, for example) to the user indicating that the hot plug operation has completed. The user may then remove the hot plug device from the particular slot on the computer system. The hot plug operation may include a determination of device criticality.

To add a hot plug device to a computer system, the user normally inserts the hot plug device into an open slot on the system and presses the attention button on the hot plug device, which initiates a hot plug operation to add the hot plug device. Once the hot plug operation has completed, an indication may be displayed (such as by a light or sound, for example) to the user indicating that the hot plug operation has completed and the hot plug device has been successfully added to computer system.

Figure 3:
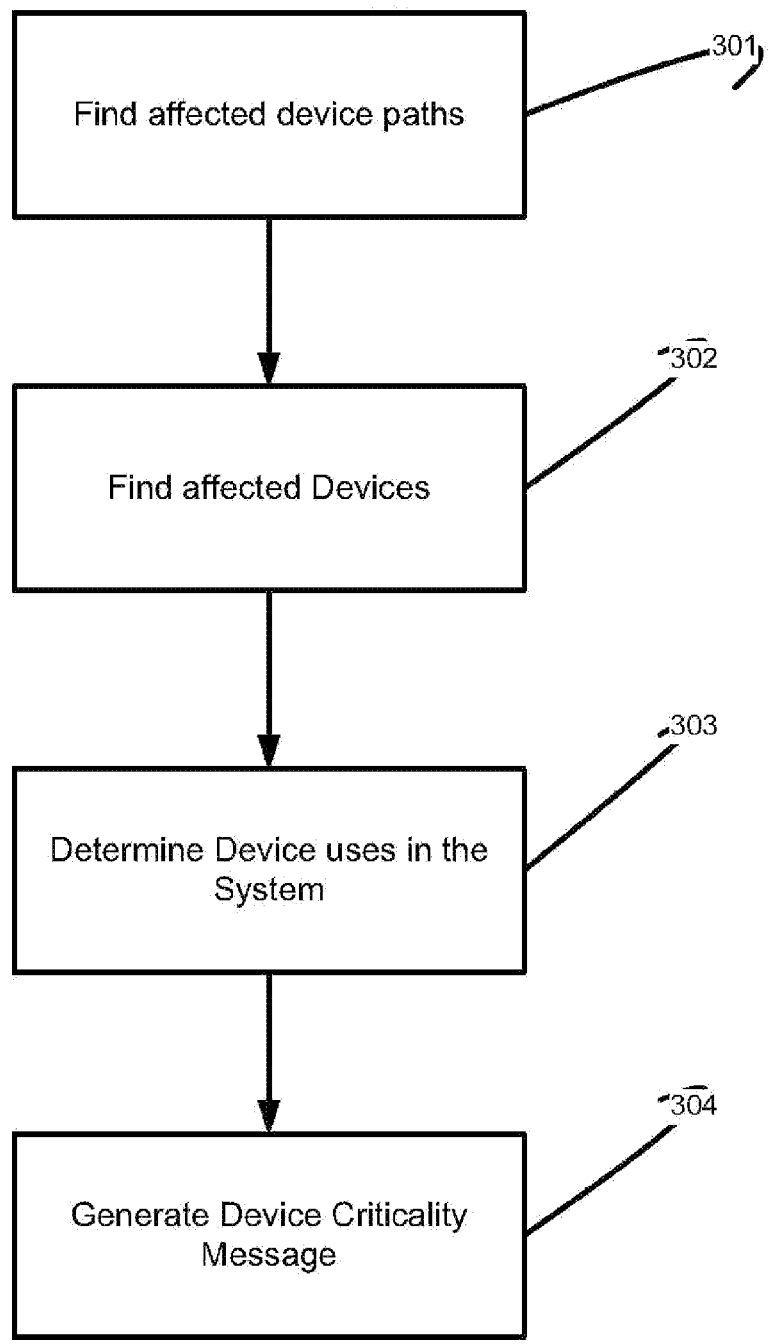
FIG. 3 is a flow diagram illustrating the steps of the present technique.

The general steps carried out to determine device criticality are set out in FIG. 3. In the system described here device criticality for the hot-plugging operation is determined by performing a sub-tree traversal on the directed acyclic graph representing the platform hierarchy to determine the potentially affected device paths for a group of Host Bus Adapters—step 301. The impacted devices are then determined from the impacted device paths—step 302; and for all impacted devices which are losing all their access paths, the impacted device's usage in the system is then determined—step 303. A device criticality message can then be generated—step 304.

These steps will now be described in more detail with reference to FIG. 4.

Figure 4:
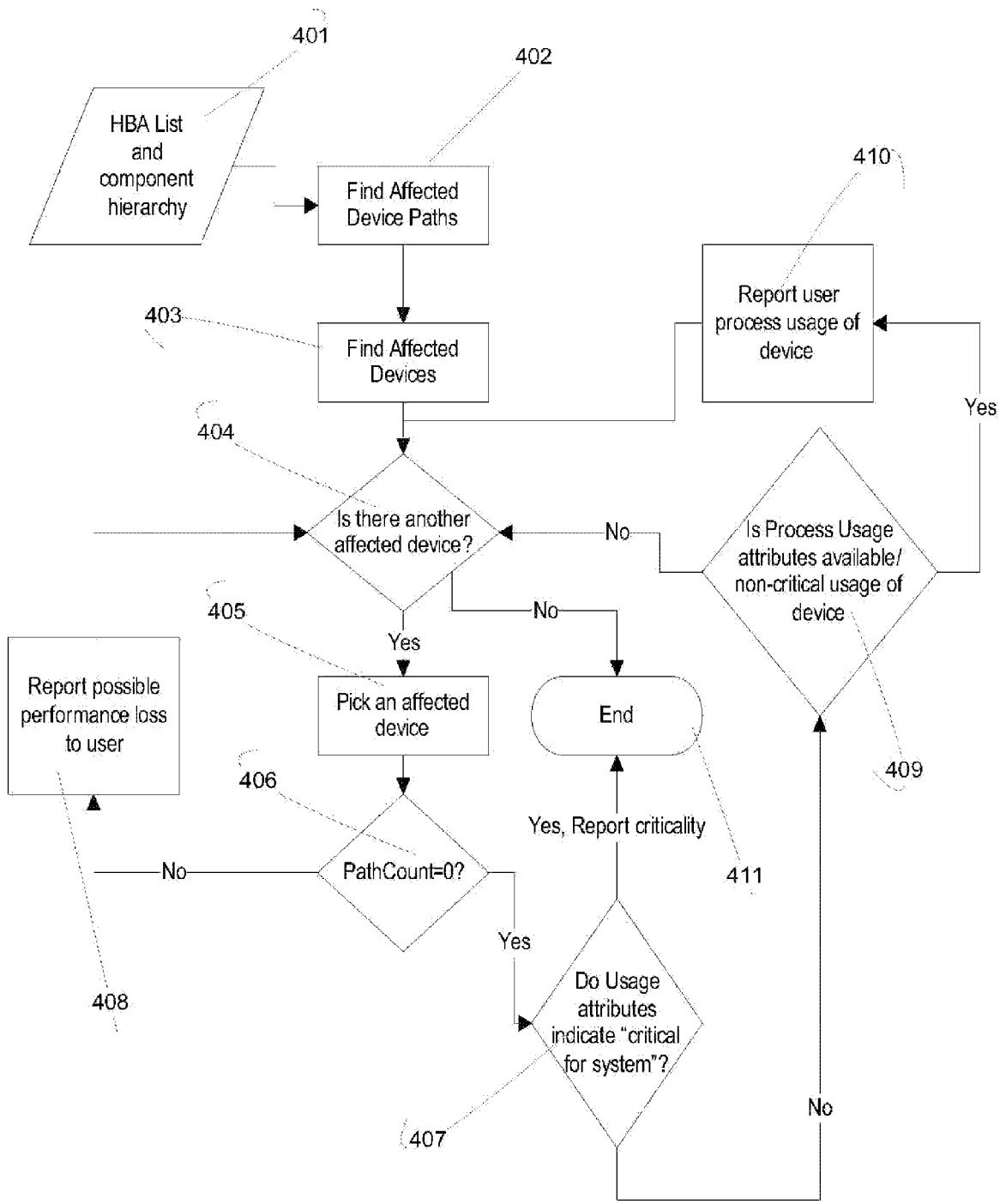
FIG. 4 is a flow diagram illustrating the steps involved in critical resource analysis of a high availability cluster using directed acyclic graph.

As illustrated in FIG. 4, the method starts with determining the number of host bus adapters in the computer system. The hierarchy of the all the peripheral devices is determined 401 in the computer configuration. As stated above in the event of a hot plugging operation either a device is added in the computer system or is removed from the computer system. If a hot plug operation is triggered on the system, a request is received to analyze the criticality of the operation. After receiving the request for hot plugging the device paths affected by the hot plugging operations are determined 402. For the affected device paths 402 found above, all the affected devices 403 are listed. The devices listed in step 403 are the devices which are losing an access path due to removal of the host bus adapter. After hot plugging operation the devices may lose some or all of their access paths depending on the configuration. For each affected device 403 the method checks for the remaining number of paths available (path count) 406 for the device after the hot plugging operation. If the path count 406 for a device after performing a hot plugging operation is non-zero i.e. after the hot plugging operation a device is not losing all its access paths, then the method reports possible performance loss and/or performance degradation 408 to the system administrator. Hot plugging may be allowed in this case. If the path count of a device is zero after the hot plugging operation then the method checks if the devices listed as affected devices are critical for system functioning 407 and/or user level processes 409. If the device has usage attributes in the component hierarchy then it is reported that the hot plugging operation may result in compromising system integrity 408. If the devices usage in the system impacts user level processes and loss of access to data for user applications, an application level criticality is reported 410.

The above-described method may be scaled to perform a cluster-wide device availability analysis for tightly-coupled clusters. A clusterware operating system may update the device's paths and path counts in the component hierarchy to reflect accessibility through other members of the cluster. If the hot-plug operation on one of the computing systems results in loss of access to the device from that computing system, the operation may still be permitted as the traffic to the device can be routed to another computing system that is still connected to the system and the method for determining device criticality described here would enable this to be determined.

Further, by checking for certain attributes stored on the nodes of the component hierarchy by the operating system, criticality of the device for the system's functioning may be determined in a straight forward and simple manner. If a device is a boot device, its node in the component hierarchy could carry an attribute indicating this. The critical resource analysis method may check for well known attributes to check if the device is critical for the system's proper functioning, thus speeding-up the process of determining the criticality of the device. In the case of clusters which use a quorum disk, the quorum disk device may carry an attribute indicating its criticality for the cluster to function properly. The critical resource analysis method performs this check as its last step. Thus the method described here to perform critical resource analysis may be made faster and more efficient.

The mechanism of setting usage attributes for a component in the computer system may be extended and made available to user level processes. Each process's usage of a device will result in the usage attribute adding the process identity (ID) to the list of processes that use that device. Once permitted, the process level impact may be determined by simply checking the usage attribute for a component.

The proposed method for determining device criticality for hot plugging operation in a multi computer system may also determine availability of multiple paths to a device using the component hierarchy. As long as the device remains accessible to the computer system through at least one path, hot-plug operations on components that affect other paths to the device may be permitted. This analysis may be performed by traversing the component hierarchy and attributes associated with the device which is maintained by the operating system.

As an example, the above mentioned method for determining device criticality in hot plugging operations in multi path computer configurations will be described in relation to the configuration illustrated in FIG. 2. The configuration of FIG. 2 comprises of three HBAs (h1, h2 and h3) and five devices (d1, d2, d3, d4 and d5). The devices are connected to the HBAs via device paths P1, P2, P3, P4, P5, P6, P7 and P8. In FIG. 2, if hot bus adapter h2 were to be removed through a hot-plug operation the technique proposed here will.

1. Determine that p2, p5 and p6 are the paths affected by removing h2.

2. The above paths result in the devices d1, d3 and d4 losing one of their access paths.

Since, a. d1 remains accessible to the system through alternate path p1 and b. d3 remains accessible to the system through alternate path p4 and c. d4 remains accessible to the system through alternate path p7.

So in this case, the hot-plug operation may be permitted with a warning to the user that there could be a performance degradation due to the toss of one of the paths to the devices.

The proposed method for determining device criticality hot plugging operations in multi path computer configurations by traversing the DAG provides an efficient way of determining the criticality of a device.

Any of the foregoing variations of the present technique may be implemented by programming a suitable general-purpose computer. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise form of the program storage device and of the encoding of instructions is immaterial here.

In the above description, various specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

The flow charts included herein do not necessarily represent an execution in a single hot plugging event, but rather, in some instances, may represent a sequence of coordinated steps, events, or processes occurring in plurality of hot plugging operations. In addition, the flow charts herein should not be interpreted as implying that no other events, steps, or processes can occur between those explicitly represented in the drawings.

The invention claimed is:

1. A method for determining the criticality of a device during a hot-plug operation in a multi-path computer configuration comprising the steps of:
    traversing a directed acyclic graph representing a platform hierarchy during the hot-plug operation;
    determining paths within the directed acyclic graph affected by the hot-plug operation of the device;
    determining devices corresponding to each affected access path;
    determining devices that lose all their access paths; and
    determining usage in the system of at least the devices that lose all their access paths, wherein the usage of devices in the system is determined from attributes stored at the nodes of the directed acyclic graph and wherein the attributes comprise at least one of whether the device is a boot device, or whether the device is a quorum disk.

2. A method as claimed in claim 1 comprising generating a device criticality message.

3. A method as claimed in claim 2 wherein, if the usage of the devices that lose all their access paths impacts user level processes, reporting an application level criticality and/or loss of access to data for user applications.

4. A method as claimed in claim 1, wherein the directed acyclic graph is maintained by the operating system.

5. A method for carrying out a hot plug removal operation in a multi-path computer configuration comprising determining the criticality of the device to be removed using a method as claimed in claim 1.

6. A method as claimed in claim 5 comprising determining that no devices lose all their access paths and permitting the hot-plug operation with a warning to the user that there could be performance degradation.

7. A computer system for determining the criticality of a device during a hot-plug operation in a multi-path computer configuration comprising a directed acyclic graph data structure representing a platform hierarchy; and a control arrangement for traversing the directed acyclic graph during the hot-plug operation to determining paths therein affected by the hot-plug operation of the device, wherein the control arrangement determines devices corresponding to each affected access path, determines devices that lose all their access paths, and determines the usage in the system of at least the devices that lose all their access paths, wherein the usage of devices in the system is determined from attributes stored at the nodes of the directed acyclic graph and wherein the attributes comprise at least one of: whether the device is a boot device, or whether the device is a quorum disk.

8. A computer system as claimed in claim 7 wherein the control arrangement is arranged to generate a device criticality message.

9. A computer system as claimed in claim 8 wherein, if the usage of the devices that lose all their access paths impacts user level processes, the control arrangement reports an application level criticality and/or loss of access to data for user applications.

10. A computer system as claimed in claim 7 comprising an operating system for maintaining the directed acyclic graph.

11. A computer system as claimed in claim 7 comprising an expansion bus having hot plug removal capability in which the control arrangement is operable to determine the criticality of a device to be removed.

12. A computer system as claimed in claim 7 wherein the computer system is a cluster.

* * * * *